United States Patent [19]
Kliebhan

[11] Patent Number: 6,134,560
[45] Date of Patent: Oct. 17, 2000

[54] METHOD AND APPARATUS FOR MERGING TELEPHONE SWITCHING OFFICE DATABASES

[76] Inventor: Daniel F. Kliebhan, 938 Royal Glen La., Carol Stream, Ill. 60188

[21] Appl. No.: 08/991,042

[22] Filed: Dec. 16, 1997

[51] Int. Cl.[7] .................................................. G06F 17/30
[52] U.S. Cl. .......................... 707/104; 706/45; 379/90.01
[58] Field of Search ......................... 707/1–10, 100–104, 707/200–206; 706/45, 47, 60; 705/8, 9, 11, 14; 395/200.31, 200.33, 200.42, 200.58

[56] References Cited

U.S. PATENT DOCUMENTS

| | | | |
|---|---|---|---|
| 4,928,233 | 5/1990 | Millis | 345/419 |
| 5,497,486 | 3/1996 | Stolfo et al. | 707/7 |
| 5,692,033 | 11/1997 | Farris | 379/67.1 |
| 5,701,400 | 12/1997 | Amado | 706/45 |
| 5,717,915 | 2/1998 | Stolfo et al. | 707/5 |
| 5,812,818 | 9/1998 | Adler et al. | 395/500.44 |

Primary Examiner—Ruay Lian Ho

[57] ABSTRACT

The individual functionality of a first computer controlled switching system can be replicated by a second system if the operational data for the first system is merged with the system-specific data for the second system. Databases for both systems can be merged by copying specific data items from the preexisting database into the appropriate data structures for system specific data. Predefined rules for the location, use, type and other requirements of missing and requisite data elements are used to locate and merge the two databases together.

18 Claims, 4 Drawing Sheets

ELECTRONIC SWITCHING SYSTEM
4 ESS SWITCH

METHOD AND APPARATUS FOR MERGING TELEPHONE SWITCHING OFFICE DATABASES

BACKGROUND OF THE INVENTION

This invention relates to computer controlled telephone switching systems. More particularly, this invention relates to a method and an apparatus for merging a database from one computer controlled switching system with a database from a second computer controlled switching system to create a third database for use with a new switching system the functionality of an old system.

Telephone switching systems in use today are largely computer controlled. These computer control systems require immense databases wherein key information about the system permits a computer to efficiently manage switching system resources.

The telephone network in the United States has become a critical resource in that the telephone network not only carries key economic information but is also essential to public safety agencies. Telephone service providers now routinely design into their systems redundancy whereby one switching system might be tasked with handling the calls of a switching system that has failed.

A problem with merely providing a backup switching system is that such a system will not function unless it is properly programmed. Programming a large telephone switching system to handle the calls of a failed system would require copying thousands, perhaps millions, of records into the replacement system. If a telephone switching system were to fail or be destroyed, bringing even a replacement system back online would still require weeks, perhaps months, of effort to re-program the new system.

Any method or apparatus that would reduce the time necessary to bring a new switching system back online would be an improvement over the prior art. Accordingly, it is an object of the present invention to provide a method and apparatus by which a database from one telephone switching system can be automatically modified to be made to work in another switching system.

SUMMARY OF THE INVENTION

The structure and organization of a database used with a particular computer controlled telephone switching system is known. In order to make a new switching system operational, vast amounts of data required by the new system must be copied into the database for the new system.

To make a new switching system work in place of a failed system, operational data from the failed system must be made to work into the database for the new system. Such information would include among other things; incoming signaling characteristics, out-going signaling characteristics, base traffic number, echo suppression indicator, circuit identification number, trunk subgroup number, and routing domain, all of which are well-known to those skilled in the art.

Rarely will the hardware in a backup switching office have the exact same hardware or hardware configuration as the hardware in an office that has failed or has been destroyed. When bringing a backup system on line to replace an office that has failed or is otherwise out of service, the operational data from the first system, including for example incoming and outgoing trunk termination data, and switching office hardware, must be made to work in the second, i.e. the backup system. Stated alternatively, the database of the old system must be merged with information for the new system to form a third database for the new system.

A first database and a second database can be married to form a third database if the structure an organization of the third database is known. Merging two previous databases to form a third is comprised of three steps. First, an element required for the third database that is known or required to come from the first database is located by searching the first database for the first required element. When this first element is found in the first database, it is typically copied into the appropriate field of the third database.

Second, if the first required element, which has been found in the first database, needs or requires additional, corresponding information from the second database, the second database is then searched for the second required element. When the second element is found in the second database, it is copied from the second database to the proper location in the third database. In some instances, required data for the third or merged database might not be literally copied from a prior database, rather, some fields within the final database might be calculated or derived from data in one or more of the previous databases or from the merged, final database.

The first element from the first database is combined with its corresponding element from the second database to form a required value for the third, i.e. new database. Successive database elements for the third database are assembled in a similar fashion. Each required element or field of the third database is assembled by searching the two pre-existing databases for elements required to create the new database. Predefined rules are written by which each data element of the new database is defined and a computer search engine is directed to search for particular data elements. In most instances, merging the two elements is merely copying the two elements into a data field or data fields of one or more prior data structures, which then forms part of the third database. Some data elements cannot be directly copied from either database; they are determined from the resultant states of other data elements that have been copied. Predetermined rules provide an appropriate methodology for deriving or calculating these new values.

The method taught herein is a bottom up procedure. The structure of the resultant database is known. The requisite components are obtained by searching the two preexisting databases. By searching both of the previous databases for data elements required to fill out the new database, the two previous databases can be merged in a bottom up procedure. By changing the rules of construction of the database or the required structure, the two databases can be merged in different ways.

DETAILED DESCRIPTION OF THE PREFERRED EMBODIMENT

Figure 1:
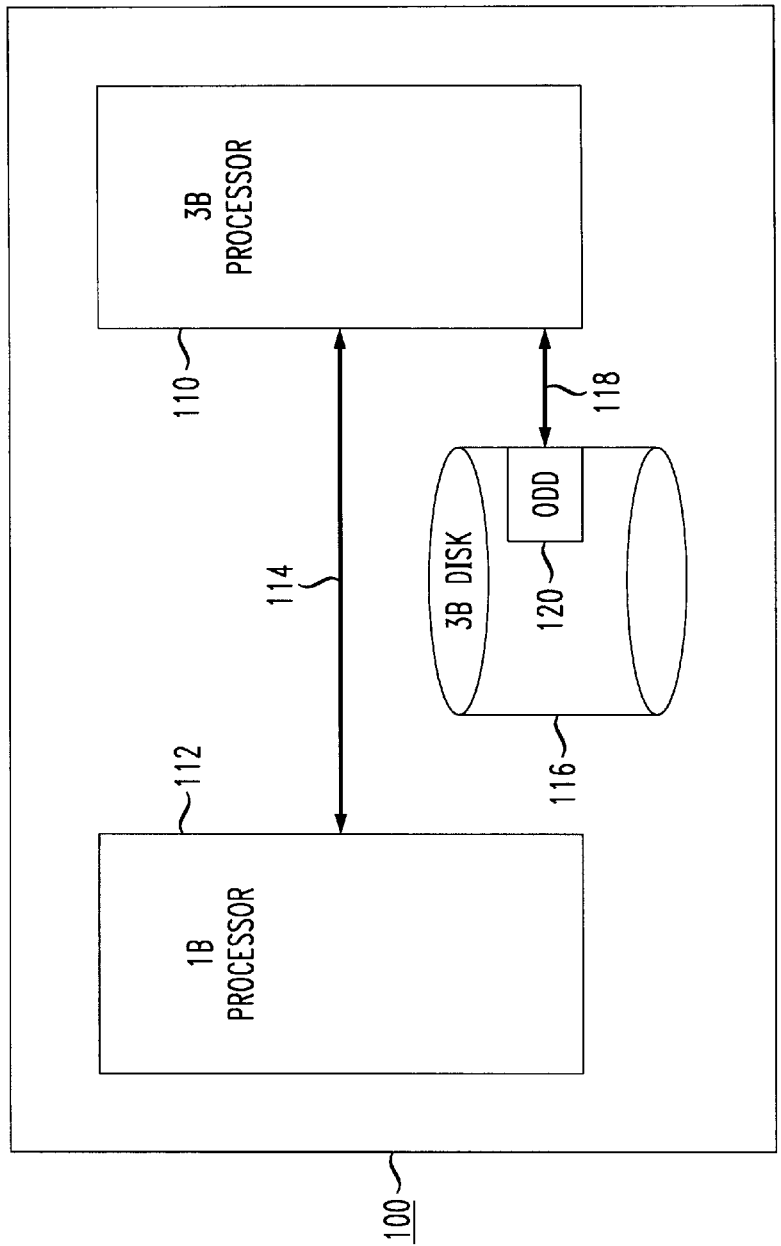
FIG. 1 shows a simplified block diagram of a computer controlled switching system controlled in part by a computer database.

In FIG. 1, a computer controlled switching system 100, such as Lucent Technologies, Inc. No. 4 ESS switching system, is comprised of switching system circuitry (not shown) controlled indirectly by a first processor 110 such as the 3B processor manufactured and sold by Lucent Technologies, Inc. The processor 110 controls another, second processor 112, such as the 1B processor, also manufactured and sold by Lucent Technologies, Inc. The first processor 110 controls the second processor 112 by means of commands sent and received over a communications bus 114 linking the two processors 110, 112. The first processor 110, with or without the second processor 112, can be considered to be a control computer for the controlled switching system 100. The communications bus 114 coupling the first processor 110 and the second processor 112 used in the No. 4 ESS switching system is well known in the art.

In the No. 4 ESS, the 1B processor 112 controls a variety of tasks of a switching system 100 including the provisioning and configuration of the switching systems and circuitry not shown. The 3B processor 110 controls the activity of the 1B processor 112 using programs and data stored on the disk (or disk resources) 116. The program files for the processor 112 and the data files on disk 116 are accessed by the 3B processor 112 through a data bus 118. One portion of the disk resource 116 is reserved for the Office Dependent Data (ODD) 120. The ODD 120 is database that contains the data structures which control and describe the hardware and services that can be provided by a given switching system 100.

Figure 2:
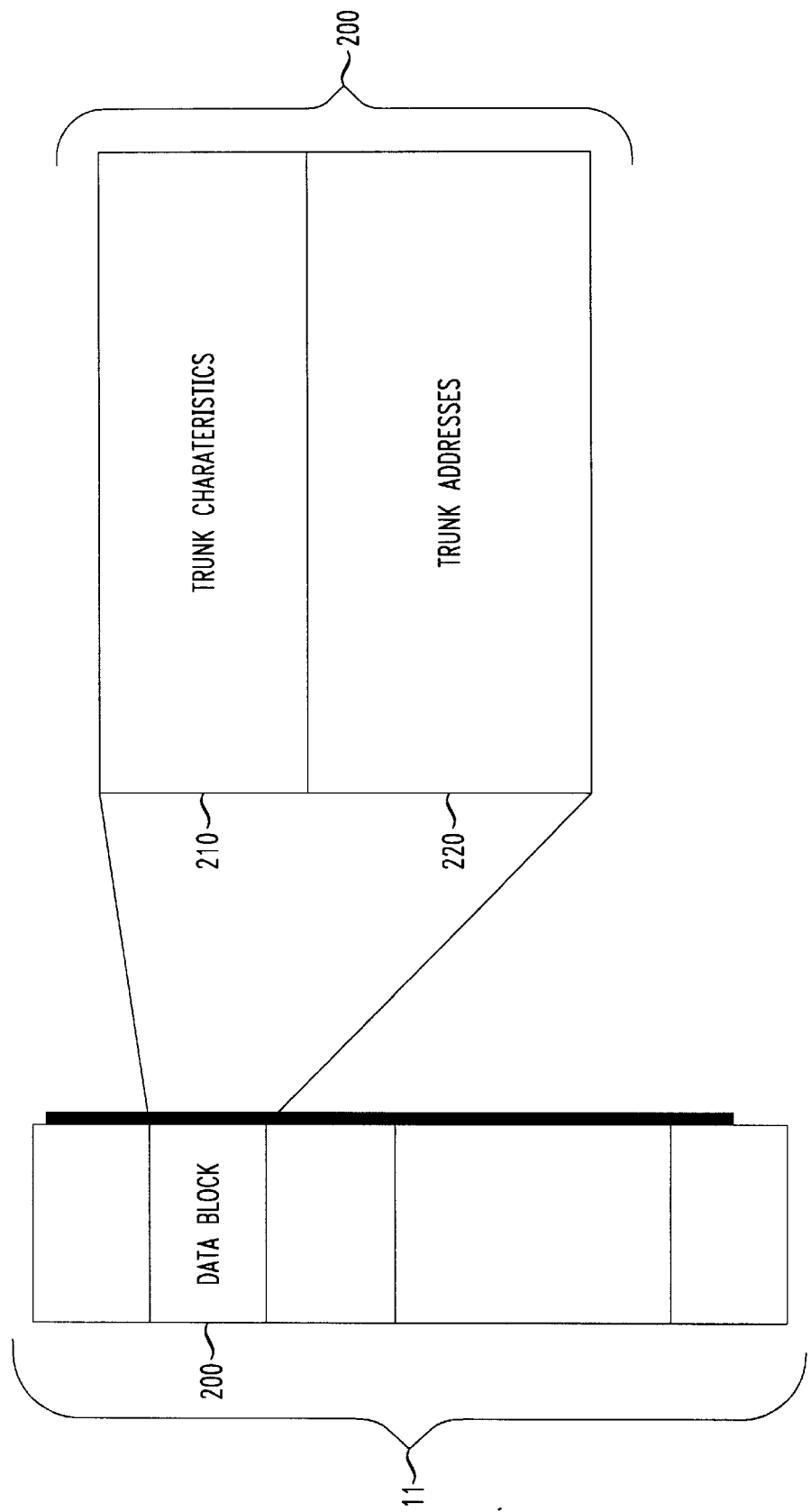
FIG. 2 shows a simplified data structure for a database used in a switching system shown in FIG. 1.

FIG. 2 shows a data structure (200) that is used in a computer controlled switching system, such as the switching system shown in FIG. 1. The data structure (200) is comprised of two components or logical data areas (210, 220). The trunk characteristics data area, header, (210) is comprised of eight bytes of data followed by the trunk address data area which is comprised of 24 bytes of data (220). The data structure shown (200) would typically be stored within the disk (116), within the ODD (120) portion thereof as shown in FIG. 1.

The eight bytes of data in the header field (210) data specify trunk characteristics for telephone trunks the addresses of which are listed in the subsequent 24 bytes of data in the trunk address field (220). The data structure (200) is used by a computer program controlling a telephone switching system (100) comprised of incoming and outgoing trunks. When the data structure (200) shown in FIG. 2 is properly filled with data, the information therein is used by the computer program controlling the switching system to identify characteristics of trunks into and out of the switching system, such as base traffic number, echo suppression indicator, circuit identification number, trunk subgroup number, and routing domain, all of which are well-known to those skilled in the telecommunications art.

Figure 3:
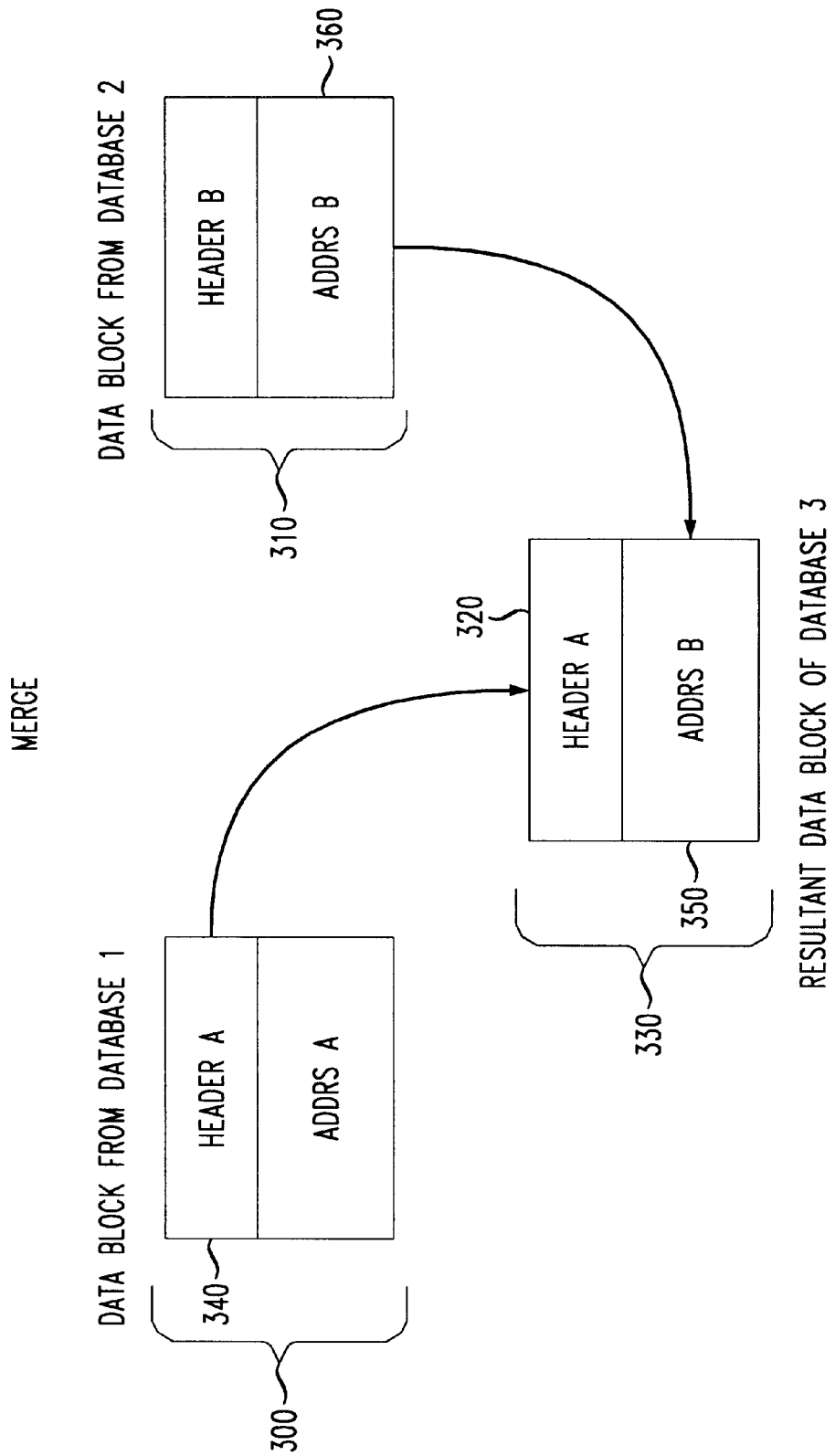
FIG. 3 shows how components of a first data structure from preexisting switching system are combined with data elements for a new switching system to form the elements of a data structure for use with a switching system, such as the system shown in FIG. 2.

FIG. 3 shows a simplified block diagram of how the header fields (210, 220) of the data structure (200) shown in FIG. 2 are obtained from two preexisting data structures (300, 310). As shown in FIG. 3, the eight-byte header field (320) of the end or product data structure (330) is obtained from a header field (340) of a data structure from a preexisting switching system. The 24-bytes of trunk address data (350) in the new data structure (330) is copied from the address data field (360) of the third data structure (310). The contents of both the header field (320) and the data field (350) can be alternatively considered to be data elements that might represent a variety of switching system features, functions, parameters or capabilities.

When used to provision a new or backup switching system to that is to functionally emulate a failed or out of service system, there might be thousands of data structures that need to be filled with data for the old system and the new system. The merger of the data from the old and new systems must produce a compatible set of data structures for use in the new, replacement system.

In an actual application, data structures from the preexisting switching system (100) would contain information required for the preexisting system to operate. The data in such a system would include, for example, information on where incoming trunks to the switch originate from and where outgoing trunks terminate. Other information stored in these data structures might include a tally of the hardware components physically present and in-service in the preexisting switching system.

In order to replicate the functionality of a failed switching system in another, backup switch, the functionality of the failed system must be replicated in the other, backup switch. Operational information (300) from a first database needs to be merged with available equipment information (310) in a second database. In addition to the aforementioned trunking information, other customer specific information would also have to be merged into the new system.

Inasmuch as the structure and organization of the information (310) of a second database is known and the information it lacks to give the system the functionality of a different, preexisting system, is also known (i.e., the missing information is known), the missing information is first obtained from the database of the preexisting system by scanning or sorting the first database. Whenever possible, the proper data from the first database is copied into the appropriate fields of the database for the replacement system.

Scanning or reading data from a database will frequently entail locating a data element using a pointer to a memory location where a particular data element can be found. A particular data element within a data structure can be read using a mask to isolate particular data fields.

In application, data required but missing for each field of the new database (320, 350) must be known in advance. The location of this data (300) in the preexisting database must also be known or otherwise be determinable algorithmically. If requisite data (300) can be found in the preexisting switch database, locating and merging that data can be accomplished using any appropriate searching and sorting algorithm on a machine with a copy of the first database or access thereto. In an actual telephone switching office database merge, numerous data structures would have to be combined from both the preexisting switch and the new switch.

Figure 4:
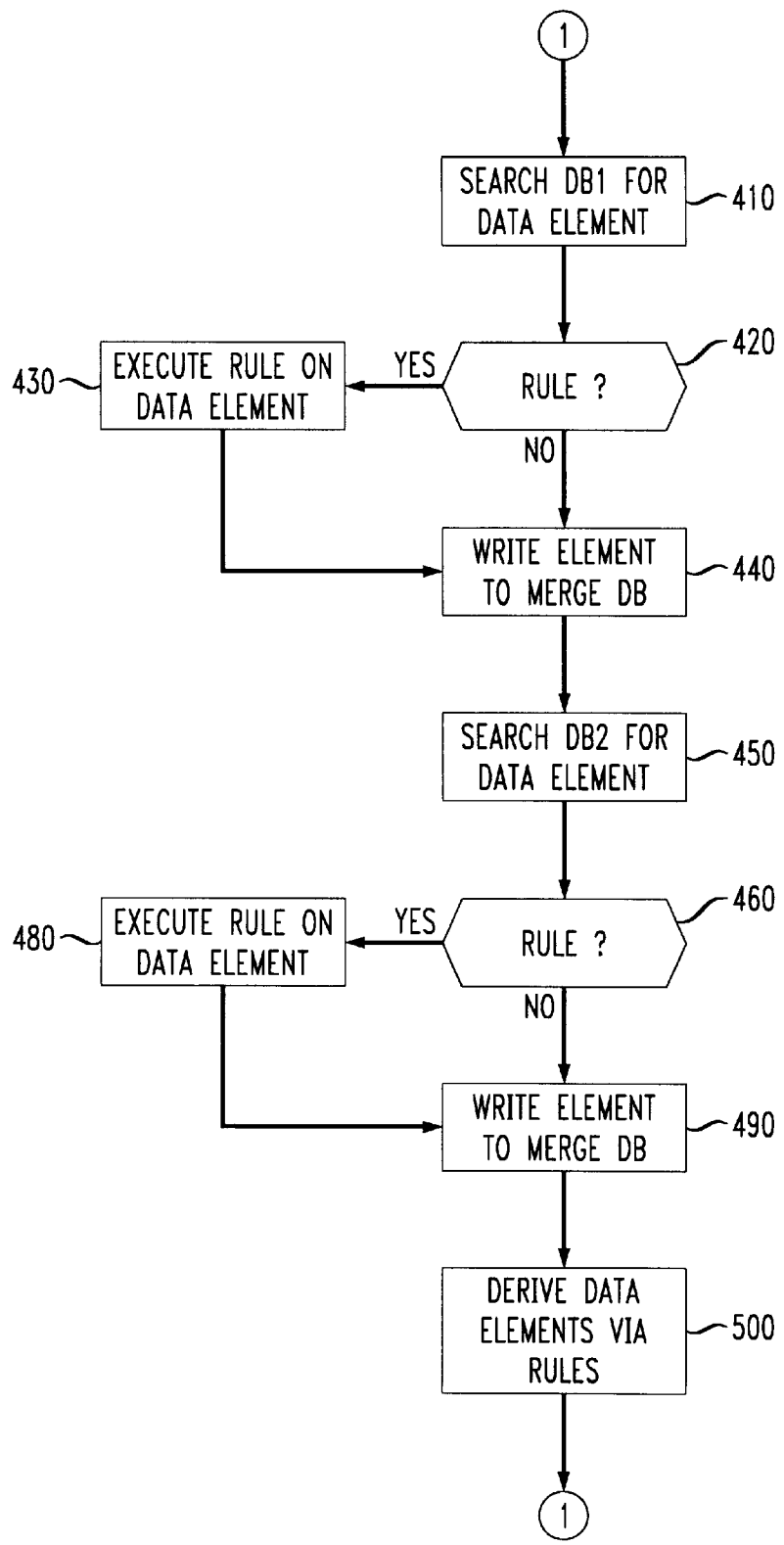
FIG. 4 shows a simplified flow chart of the process by which two bases for different switching systems can be merged.

FIG. 4 shows a simplified block diagram (400) of the steps of the method taught herein.

First, a data element required for a data structure is located by searching the first database (410). If the data element is identified or determined by a rule (420) the rule is used to identify or determine the data element (430). If the data element can be read directly from the first database, the data element is copied from the first database to the second database.

Some data elements required for the first element previously located as set forth above can be located in the second database merely by searching the second database (440). If a required element from the second database cannot be directly copied from the second database but requires a rule to be identified, calculated or derived (460) any rule of construction to determine the second data element is executed (480) after which the data element is written to the new database (490).

In the preferred embodiment, each data field (320, 350) of each data block or data structure (330) is populated with new data from a preexisting switch and a replacement switch database using specified, predetermined rules for each data element of each data structure. These rules define the data required for each field of the data block or data structure (330) in the database and permit the data structures of a database to be determined algorithmically.

Merging two databases can be achieved by following the rules by which the missing data is defined. Data elements from the first database of a system to be replaced can be algorithmically determined as well as data elements of the switch that is to emulate a preexisting switch. Instead of merely copying data elements from one database to another, data elements can be derived or determined by following the aforementioned rules. Of course, as the size and complexity of the database and its data structures increases, the number of rules increases as well. By defining data required for fields in a data structure, such data can be obtained from preexisting databases and merged with one or more databases to form a new database. The new data block or data structure (330) so formed can be used to replicate the functionality of a switching system using new hardware components. By automating the search and assembly process, the creation of a new database for a complex switching system replicating the functionality of another system can be achieved in significantly less time than manually re-entering data.

The actual automated merging of the databases that is described above is carried out by a suitably programmed digital computer. In the preferred embodiment, a single Sun Microsystems workstation was programmed to scan databases resident on disk resources accessible to the workstation. Alternate embodiments would include using multiple workstations and scanning multiple disk resources containing the databases being merged. Merging databases using one or more off-line or dedicated computers such as a workstation allows more robust computer resources to expedite the merging process. After the databases are so merged, the resultant database can be appropriately copied into the target system for use by the target system. A Lucent Technologies, Inc. 3B computer for example, might also be programmed to scan databases for both a failed switching system copied onto its disk resource and a database for switching equipment to replace the failed system although such an embodiment would likely require the 3B computer to perform call processing tasks as well.

While the preferred embodiment of the invention contemplates that a single computer will scan databases for both switching systems, i.e. the database of the failed system and the database for the replacement system, or copies thereof, alternate embodiments of the invention would include implementations wherein a computer resident in, on, or at a failed or failing system, scans its own data base for particular data records and sends such records to the computer or disk resource for a replacement switching system. Such an embodiment would include sending of an appropriate command to the computer for the failed or failing system causing it to begin searching for a particular record or records, i.e. the scanning might be done remotely and results then sent to the computer or system that initiated the scan.

In such an alternate embodiment, once a proper record is found, it can be returned to the replacement system for merger with the database of the replacement system. There is no necessity or requirement that the databases be co-located on a single computer, computer resource, or be geographically co-located. The respective databases could reside with the respective systems. Data records from a first system, to be merged with records from a second system need only to be received at the second system where they are combined with data elements of the second system to form a third database for the second system.

Alternate embodiments of the invention would of course include using another computer, such as a suitably programmed work station or personal computer for example, to merge switching system databases together.

Those skilled in the art will also recognize that while the embodiment disclosed herein has been with reference to a particular computer controlled switching system, the method and apparatus disclosed herein could be used with other data bases. Inventory control systems, accounting systems, and other large data bases having functionally related data structures from two data bases could be combined by the aforementioned method. Of course the rules of merging data structures or portions thereof would need to be customized for the databases being merged.

As set forth above, the computer performing the merger operations need only have access to data records comprising the respective databases, components of which are to be combined. Thus, a single computer, i.e. either computer disclosed in the figures, merely having access to data records, could perform the operations necessary to merge two databases. Those skilled in the art will also recognize that while two databases have been disclosed, several databases could be scanned for functionally related components necessary to assemble a useable database. In such an instance, elements required to form a working, useable database might be obtained from several different databases by searching the several databases for the required data elements.

What is claimed is:

1. In a first computer database comprised of a plurality of data elements arranged in a first set of data structures and a second computer database comprised of a plurality of data elements arranged in a second set of data structures, a method of merging data elements from said first computer database with elements of said second computer database to form a third computer database comprised of:

a) at a first computer having access to at least a portion of said first computer database, obtaining therefrom at least a first predetermined data element from said first computer database;

b) scanning at least a portion of said second computer database by said first computer for a second predetermined data element functionally related to said first predetermined data element from said first, computer database;

c) merging said first data element and said second data element by said first computer to form a first data element record in a third database, wherein a software controlling portion/operational information of said first computer database is merged with a hardware-controlling portion of the second computer database to provide the third database with the software-controlling portion of said first computer database and of said second computer database with the hardware-controlling portion of the second computer database.

2. The method of claim 1 wherein said step a) of receiving at least a first predetermined data element from said first database includes the step of:

i) receiving at said first computer at least a first predetermined data element from said first database that is obtained by scanning said first database by said first computer.

3. The method of claim 1 wherein said step a) of receiving at least a first predetermined data element from said first database includes the step of:

i) receiving at said first computer a first predetermined data element from said first database obtained by scanning said first database while said first computer is at a first location and said second database is at a second location.

4. In a first computer-controlled telephone switching system operating with a first computer database comprised of a plurality of data elements arranged in a first set of data structures and a second computer controlled telephone switching system operating with a second computer database comprised of a plurality of data elements arranged in a second set of data structures, a method of merging data elements from said first computer database with elements of said second computer database to form a third computer database for use with said second computer-controlled telephone switching system comprised of:

a) at said second computer controlled switching system, receiving at least a first predetermined data element from said first computer database;

b) scanning said second computer database for a second predetermined data element functionally related to said first predetermine data element;

c) merging said first data element and said second data element to form a first data element record in the third computer database, wherein a software controlling portion/operational information of said first computer database is merged with a hardware-controlling portion of the second computer database to provide the third computer database with the software-controlling portion of said first computer database and of said second computer database with the hardware-controlling portion of the second computer database.

5. The method of claim 4 wherein said step a) of receiving at least a first predetermined data element from said first database includes the step of:

i) receiving at said second computer controlled telephone switching system at least a first predetermined data element from said first database that is obtained by scanning said first database in said first computer-controlled telephone switching system.

6. The method of claim 4 wherein said step a) of receiving at least a first predetermined data element from said first database includes the step of:

i) receiving at said second computer controlled telephone switching system, at least a first predetermined data element from said first database obtained by scanning said first database by said first computer-controlled telephone switching system while said first computer controlled telephone switching system is at a first location and said second computer controlled switching system is at a second location.

7. The method of claim 4 further including the step of: sending a control signal to said first computer-controlled telephone switching system to begin scanning said first database for said first predetermined data element.

8. In a first computer-controlled telephone switching system operating with a first computer database comprised of a plurality of data elements arranged in a first set of data structures and a second computer controlled telephone switching system operating with a second computer database comprised of a plurality of data elements arranged in a second set of data structures, a method of merging data elements from said first computer database with elements of said second computer database to form a third computer database for use with said second computer-controlled telephone switching system comprised of:

a) scanning said first database for at least one first predetermined data element;

b) scanning said second computer database for a second predetermined data element functionally related to said first predetermined data element;

c) merging said first data element and said second data element to form a first data element record in a third computer database, wherein a software controlling portion/operational information of said first computer database is merged with a hardware-controlling portion of the second computer database to provide the third computer database with the software-controlling portion of said first computer database and of said second computer database with the hardware-controlling portion of the second computer database.

9. The method of claim 8 wherein said step of scanning said first database for at least one first predetermined data element includes scanning a plurality of predetermined data structures of said first database for predetermined data elements within defined fields of said data structures of said first database and copying said data elements with said defined fields.

10. The method of claim 8 wherein said step of scanning said second database for a second predetermined data element functionally related to said first predetermined data element includes algorithmically determining at least one data element of a plurality of predetermined data structures.

11. The method of claim 8 wherein said merging said first data element and said second data element to form a first data element record in a third database includes algorithmically determining said at least one first predetermined data element from said first database to a first data field of said third database and algorithmically determining said a second predetermined data element functionally related to said first predetermined data element to a second data field of said third database.

12. A method of merging a first computer database and a second computer database into a third database having at least one data structure comprised of a plurality of data elements ordered into a plurality of date fields comprised of the steps of:

a) specifying the contents of each data field;

b) scanning said first computer database for a first data element for entry into said third database;

c) copying said first predetermined data element into at least one data field of said at least one data structure;

d) scanning said second database for a second data element for entry into said third database;

e) copying said second data element into at least one data field of said at least one data structure, wherein a software controlling portion/operational information of said first computer database is merged with a hardware-controlling portion of the second computer database to provide the third database with the software-controlling portion of said first computer database and of said second computer database with the hardware-controlling portion of the second computer database.

13. A method of merging a first computer database and a second computer database into a third database having at least one data structure comprised of a plurality of data elements ordered into a plurality of data fields comprised of the steps of:

a) specifying the contents of each data field in said third database;

b) scanning said first database for a first data element;

c) scanning said second computer database for a second data element;

d) determining a data element for said third database by algorithmically evaluating said first data element and said second data element to produce a data element for entry into said third database, wherein a software controlling portion/operational information of said first computer database is merged with a hardware-controlling portion of the second computer database to provide the third database with the software-controlling portion of said first computer database and of said second computer database with the hardware-controlling portion of the second computer database.

14. A first computer controlled switching system having a first computer database comprised of a plurality of data elements arranged in a first set of data structures, said first computer database missing a plurality of required data elements to be obtained from and merged with data elements from a second database for a second computer controlled switching system, said first computer-controlled telephone switching system comprised of:

a) means for scanning said first computer database for at least one first predetermined data element;

b) means for scanning said second database for a second predetermined data element functionally related to and to be merged with said first predetermined data element;

c) means for merging said first data element and said second data element to form a first data element record in said first computer database for said first switching system, wherein a software controlling portion/operational information of said second database is merged with a hardware-controlling portion of the first computer database to provide the functionality of the software-controlling portion of said first computer database and of said second computer database with the hardware-controlling portion of the first computer database.

15. The apparatus of claim 14 where said means for scanning said first database is a computer.

16. The apparatus of claim 14 where said means for scanning said second database for a second predetermined data element is a computer.

17. The apparatus of claim 14 where said means for merging said first data element and said second data element to form a first data element record in said first database for said first switching system is a computer.

18. A first computer controlled switching system having a first computer database comprised of a plurality of data elements arranged in a first set of data structures, said first computer database missing a plurality of required data elements to be obtained from and merged with data elements from a second database for a second computer controlled switching system said first computer-controlled telephone switching system comprised of:

a) a first computer coupled to at least one data storage device containing said first computer database and said second database and capable of scanning said first and second databases for data elements functionally related to each other;

b) a data storage device capable of storing a database formed by the merger of said first and second databases, wherein a software controlling portion/operational information of said second database is merged with a hardware-controlling portion of the first computer database to provide functionality of the software-controlling portion of said first computer database and of said second computer database with the hardware-controlling portion of the first computer database.

* * * * *